(12) United States Patent
Gadhiya et al.

(10) Patent No.: US 8,567,855 B2
(45) Date of Patent: Oct. 29, 2013

(54) BUMPER MOUNTING PLATE FOR DOUBLE CHANNEL FRONT RAILS

(75) Inventors: Hitendra Laxmidas Gadhiya, Irvine, CA (US); Alexi Charbonneau, Hermosa Beach, CA (US); Nils Petter Winberg, San Carlos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 65 days.

(21) Appl. No.: 13/337,073

(22) Filed: Dec. 24, 2011

(65) Prior Publication Data

US 2012/0175898 A1    Jul. 12, 2012

Related U.S. Application Data

(63) Continuation of application No. 13/337,070, filed on Dec. 24, 2011, now Pat. No. 8,424,960.

(60) Provisional application No. 61/430,622, filed on Jan. 7, 2011.

(51) Int. Cl.
 *B62D 25/08* (2006.01)
(52) U.S. Cl.
 USPC ............... 296/203.02; 296/187.09; 296/187.1

(58) Field of Classification Search
 USPC ............... 296/203.02, 187.09, 187.1, 204; 293/133, 155
 See application file for complete search history.

(56) References Cited

U.S. PATENT DOCUMENTS

| | | | | |
|---|---|---|---|---|
| 6,227,322 B1 * | 5/2001 | Nishikawa | ............ | 180/68.5 |
| 7,273,247 B2 * | 9/2007 | Grueneklee et al. | ............ | 296/205 |
| 8,002,338 B2 * | 8/2011 | Yasuhara et al. | ............ | 296/203.02 |
| 8,246,105 B2 * | 8/2012 | Mildner | ............ | 296/187.09 |
| 8,297,668 B2 * | 10/2012 | Nakanishi et al. | ............ | 293/132 |
| 2011/0297470 A1 * | 12/2011 | Heichal et al. | ............ | 180/68.5 |

* cited by examiner

*Primary Examiner* — Dennis Pedder
(74) *Attorney, Agent, or Firm* — J. Richard Soderberg

(57) ABSTRACT

A front structure for a vehicle is provided, the structure including (i) a pair of front rails (i.e., front left hand rail and front right hand rail) spaced apart in a widthwise direction with each rail extending lengthwise, and where each rail is comprised of a polygonal-shaped upper hollow channel and a polygonal-shaped lower hollow channel with the upper and lower channels sharing a common wall; and (ii) a pair of bumper mounting plates, where one bumper mounting plate is interposed between the end portion of each channel of each rail and the vehicle's bumper, and where each bumper mounting plate aligns the upper rail channels with the vehicle's bumper while transferring impact loads to both the upper and lower rail channels.

20 Claims, 19 Drawing Sheets

BUMPER MOUNTING PLATE FOR DOUBLE CHANNEL FRONT RAILS

CROSS-REFERENCE TO RELATED APPLICATION

The present application claims is a continuation of U.S. patent application Ser. No. 13/337,070, filed 24 Dec. 2011, and claims benefit of the filing date of U.S. Provisional Patent Application Ser. No. 61/430,622, filed 7 Jan. 2011, the disclosure of which is incorporated herein by reference for any and all purposes.

FIELD OF THE INVENTION

The present invention relates generally to vehicle structures and, more particularly, to front-end vehicle structures that provide enhanced load distribution and occupant safety.

BACKGROUND OF THE INVENTION

Modern vehicles use a variety of structures to protect the vehicle's occupants during a crash. Some of these structures are used to control the transmission of the crash energy to the passenger compartment while other structures, such as seat belts, head restraints, and air bags, are intended to restrain passenger movement during a crash, thereby preventing the passengers from hurting themselves as their bodies react to the crash forces. In addition to reducing the potential for personal injuries, many vehicle crash structures are also designed to minimize vehicle damage and simplify post-crash repairs.

A variety of different approaches and structures have been used to absorb and control the transmission of crash energy into the vehicle. As the bumper is typically the first vehicle structure to be impacted during a crash, many crash structures attempt to absorb as much energy as possible in the bumper itself, thus minimizing the energy that is transmitted into the vehicle. For example, U.S. Pat. No. 4,018,466 discloses a bumper assembly in which the bumper is comprised of a hollow beam that houses a plurality of shock absorbing cellular blocks. The shock absorbing cellular blocks are inserted into pocket-like sections of the bumper. In an alternate shock-absorbing bumper, disclosed in U.S. Pat. No. 6,000,738, the bumper includes an outer wall disposed to receive the crash force, an inner wall that is coupled to the vehicle structure and four walls that connect the inner and outer bumper walls. During a car crash, the four connecting walls are designed to bend at a controlled rate, thereby absorbing crash energy.

While crash energy may be absorbed in the bumper, large impact crashes typically require the use of other energy absorbing structures. For example, in a conventional vehicle the bumpers are often coupled to the vehicle by one or more crash boxes that are designed to collapse during a crash, thereby absorbing crash energy. U.S. Pat. No. 7,290,811 discloses one design for a crash box in which two overlapping and interconnected sheet metal shells form the crash box. The crash box is bolted to the bumper cross-member using at least one bolt that extends in a vertical direction through the overlap zone of the structure. U.S. Pat. No. 7,533,913 discloses an alternate crash box design using inner and outer curved members which extend in the longitudinal direction of the vehicle. The inner member includes a plurality of bead-shaped protrusions that are intended to cause longitudinal compressing deformation of this member in a low-speed collision, thereby helping to direct the striking energy created by the collision away from the inside of the vehicle.

In addition to designing the front structure of a vehicle to absorb and distribute the impact loads generated during a crash, it is critical that these same structures also achieve the desired level of vehicle stability and maneuverability, preferably in a lightweight structure that minimizes its impact on the vehicle's MPG or $MPG_{equivalent}$. One attempt at balancing these goals is disclosed in U.S. Patent Application Publication No. 2004/0056515, published 25 Mar. 2004, in which a relatively simple front structure is provided that is designed to be rigid and, due to the elimination of various reinforcing members, lightweight.

It is therefore an object of the present invention to provide a vehicle front structure that achieves improved performance in terms of front impact load distribution, structure weight, vehicle frame rigidity, and vehicle maneuverability.

SUMMARY OF THE INVENTION

The present invention provides a front structure for a vehicle, the structure including (i) a pair of front rails (i.e., front left hand rail and front right hand rail) spaced apart in a widthwise direction with each rail extending lengthwise, and where each rail is comprised of a polygonal-shaped upper hollow channel and a polygonal-shaped lower hollow channel with the upper and lower channels sharing a common wall; and (ii) a pair of bumper mounting plates, where one bumper mounting plate is interposed between the end portion of each channel of each rail and the vehicle's bumper, and where each bumper mounting plate aligns the upper rail channels with the vehicle's bumper while transferring impact loads to both the upper and lower rail channels. Each bumper mounting plate may include an upper sleeve configured to fit within the polygonal-shaped upper hollow channel of the corresponding rail, and a lower sleeve configured to fit within the polygonal-shaped lower hollow channel of the corresponding rail, with the mounting plate sleeves preferably being riveted and/or bonded to the channels of the rail. The bumper mounting plates may be die cast, for example using a die cast aluminum or aluminum alloy. The front structure of the vehicle may include a pair of crush cans, where one crush can is interposed between each bumper mounting plate and the vehicle's bumper. The front structure of the vehicle may include a front vehicle module with a pair of mounting plates, where a front vehicle module mounting plate is interposed between each bumper mounting plate and the vehicle's bumper. The left hand and right hand front rails may be non-parallel, e.g., offset by at least 2.5 degrees from one another, and fabricated from an aluminum extrusion, an aluminum alloy extrusion or a steel extrusion. The left hand and right hand front rails may each have a cross-sectional height at least 2 times, and preferably at least 2.5 times, the cross-sectional width of each rail. The polygonal-shaped upper and lower hollow channels of the front rails may utilize a regular or non-regular octagon-shaped structure, or a regular or non-regular hexagon-shaped structure. An end portion of each rail, distal from the end portion coupled to the bumper mounting plate, may be mechanically coupled to a torque box which, in turn, is coupled to a rocker panel. The structure may include a battery pack enclosure mounted between and mechanically coupled to the left and right hand rocker panels. The battery pack enclosure, which may be substantially airtight and fabricated from aluminum, an aluminum alloy or steel, includes a top panel, a bottom panel and a plurality of side members. The battery pack enclosure may also include a plurality of battery pack cross-members that traverse the distance between enclosure side members adjacent to the left and right hand rocker panels, and that segregate the batteries into groups of batteries.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries electrically interconnected to achieve the desired voltage and capacity for a particular application. The batteries of the battery pack are contained within a single piece or multi-piece housing referred to herein as a battery pack enclosure, and often referred to herein as simply the "battery pack". The term "electric vehicle" as used herein refers to either an all-electric vehicle, also referred to as an EV, a plug-in hybrid vehicles, also referred to as a PHEV, or a hybrid vehicle, also referred to as a HEV, a hybrid vehicle utilizing multiple propulsion sources one of which is an electric drive system.

Figure 1:
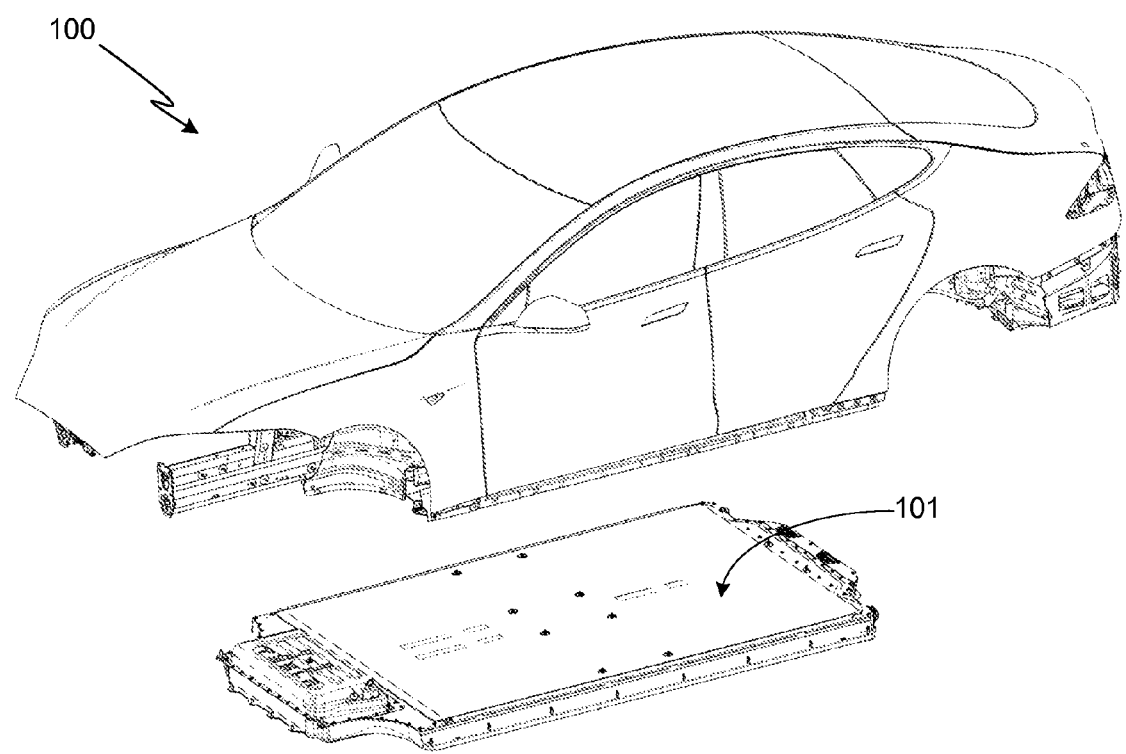
FIG. 1 provides a perspective view of a portion of a vehicle body and frame with the battery pack separated from the structure.
Figure 2:
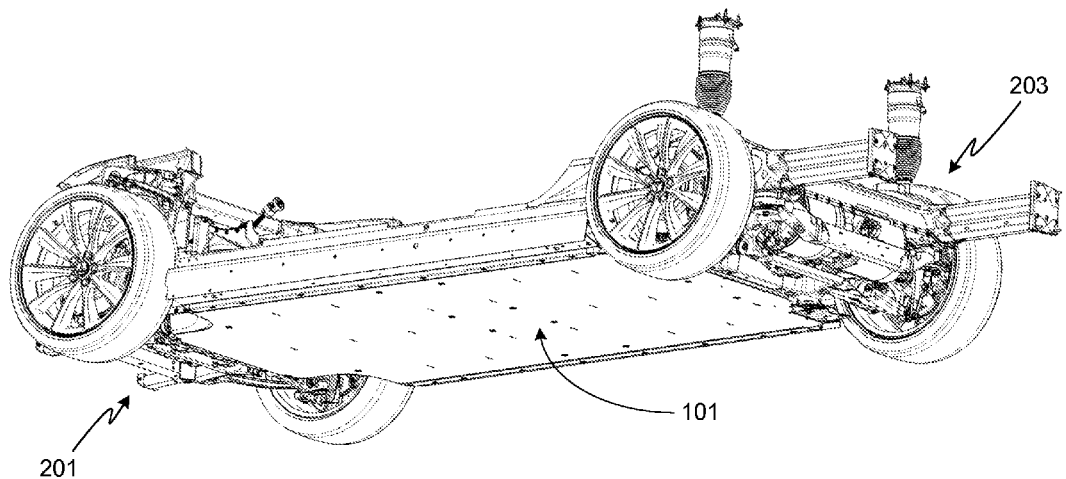
FIG. 2 provides a perspective view of a vehicle's undercarriage with the battery pack of FIG. 1 incorporated into the vehicle structure.
Figure 3:
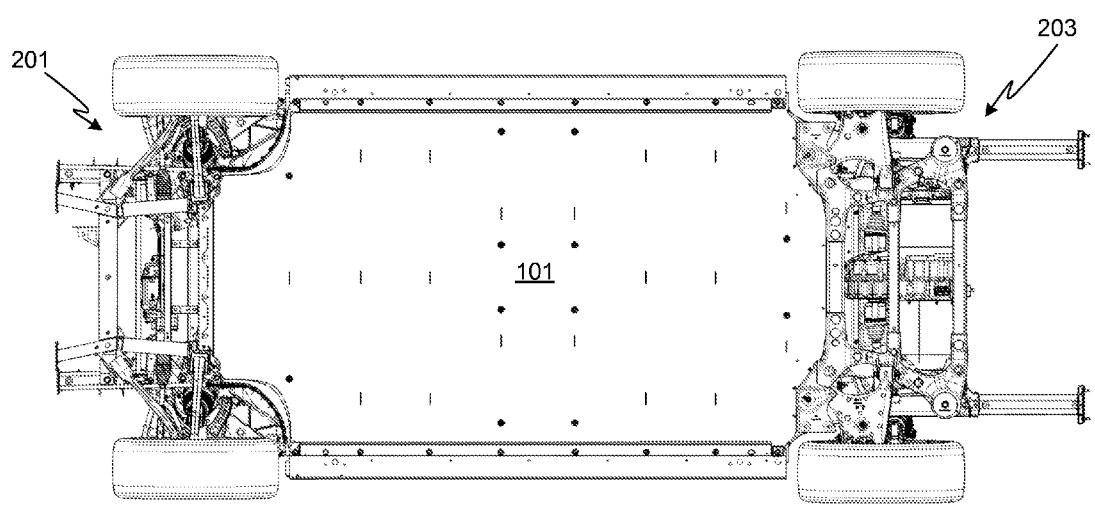
FIG. 3 provides a simplified bottom view of an electric vehicle's undercarriage with the battery pack of FIG. 1 incorporated into the vehicle structure.

The present invention provides a number of vehicle structures and assemblies which, used alone or in combination, provide superior vehicle performance. Although these structures and assemblies may be used in both electric vehicles and conventional vehicles, in general they have been optimized to achieve peak performance in an electric vehicle, and in particular in an electric vehicle in which a large battery pack enclosure is integrated into the vehicle's frame as illustrated in FIGS. 1-3. As shown, battery pack enclosure 101 is mounted to the undercarriage of a vehicle 100 and attached to the body sub-frame as well as the front and rear suspension sub-frames. Preferably and as shown, battery pack enclosure 101 transverses the width of the vehicle, i.e., from rocker panel to rocker panel, and extends between the front suspension 201 and the rear suspension 203. In the illustrated embodiment, battery pack 101 is approximately 2.7 meters long and 1.5 meters wide. The thickness of battery pack enclosure 101 varies from approximately 0.1 meters to 0.18 meters, the thicker dimension corresponding to those portions of the battery pack in which battery modules are positioned one on top of another.

Figure 4:
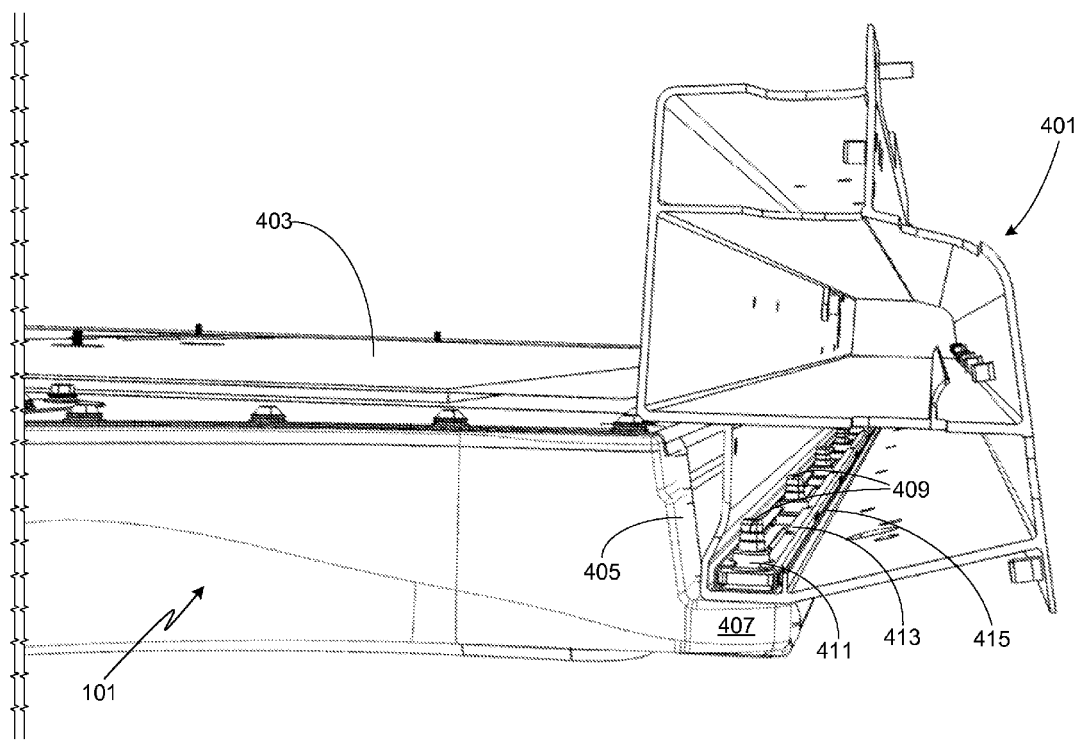
FIG. 4 provides a perspective view of a battery pack to rocker panel assembly.

As noted above, preferably battery pack 101 is configured to transverse the width of the vehicle and be coupled to the rocker panels located on either side of the vehicle. FIG. 4 illustrates an exemplary technique for attaching battery pack 101 to rocker panel 401, this figure showing the location of battery pack 101 under vehicle floor panel 403. Preferably rocker 401 is extruded, for example using an aluminum or aluminum alloy extrusion as described in detail in co-pending U.S. patent application Ser. No. 13/308,206, filed 30 Nov. 2011, and attached to the battery pack as described in co-pending U.S. patent application Ser. No. 13/308,300, filed 30 Nov. 2011, the disclosures of which are incorporated herein for any and all purposes. In general and as illustrated for the preferred embodiment, battery pack enclosure 101 includes side members 405 that include a mounting flange. In the illustrated embodiment, the mounting flange is an extended mounting region 407 that is positioned under rocker 401. Region 407 is perforated in order to allow passage of a plurality of mounting bolts 409. Mounting bolts 409, in combination with nuts 411, mechanically couple extended region 407 of battery pack 101 to rocker 401. To simplify assembly, channel nuts 411 are held in place during vehicle assembly using a channel nut retainer 413. Retainer 413 is positioned within rocker 401 using internal feature 415, thereby simplifying vehicle assembly and reducing manufacturing costs. It will be understood that other techniques may be used to mount the battery pack under the vehicle's floor panel.

Figure 5:
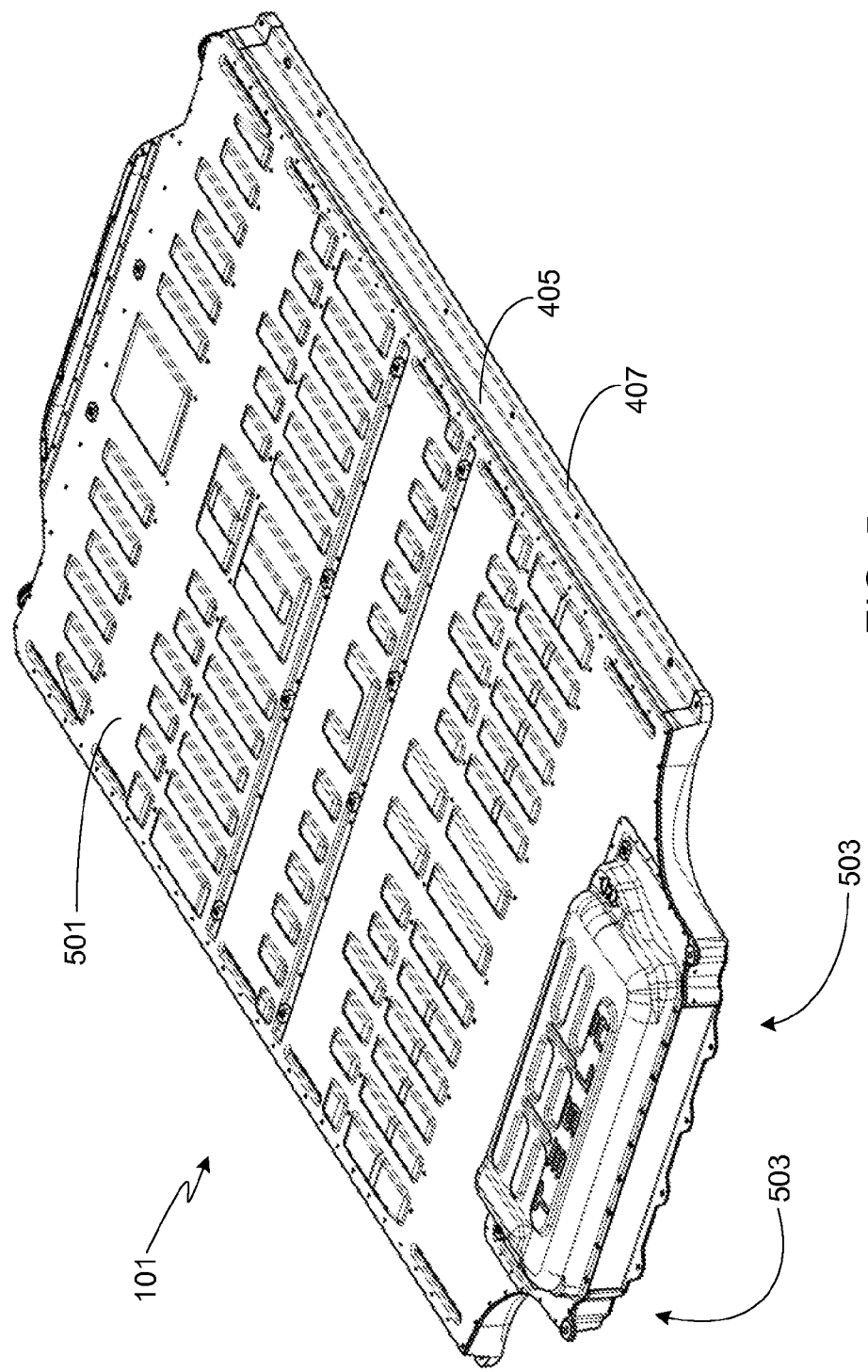
FIG. 5 provides a perspective view of the battery pack shown in FIGS. 1-4.
Figure 6:
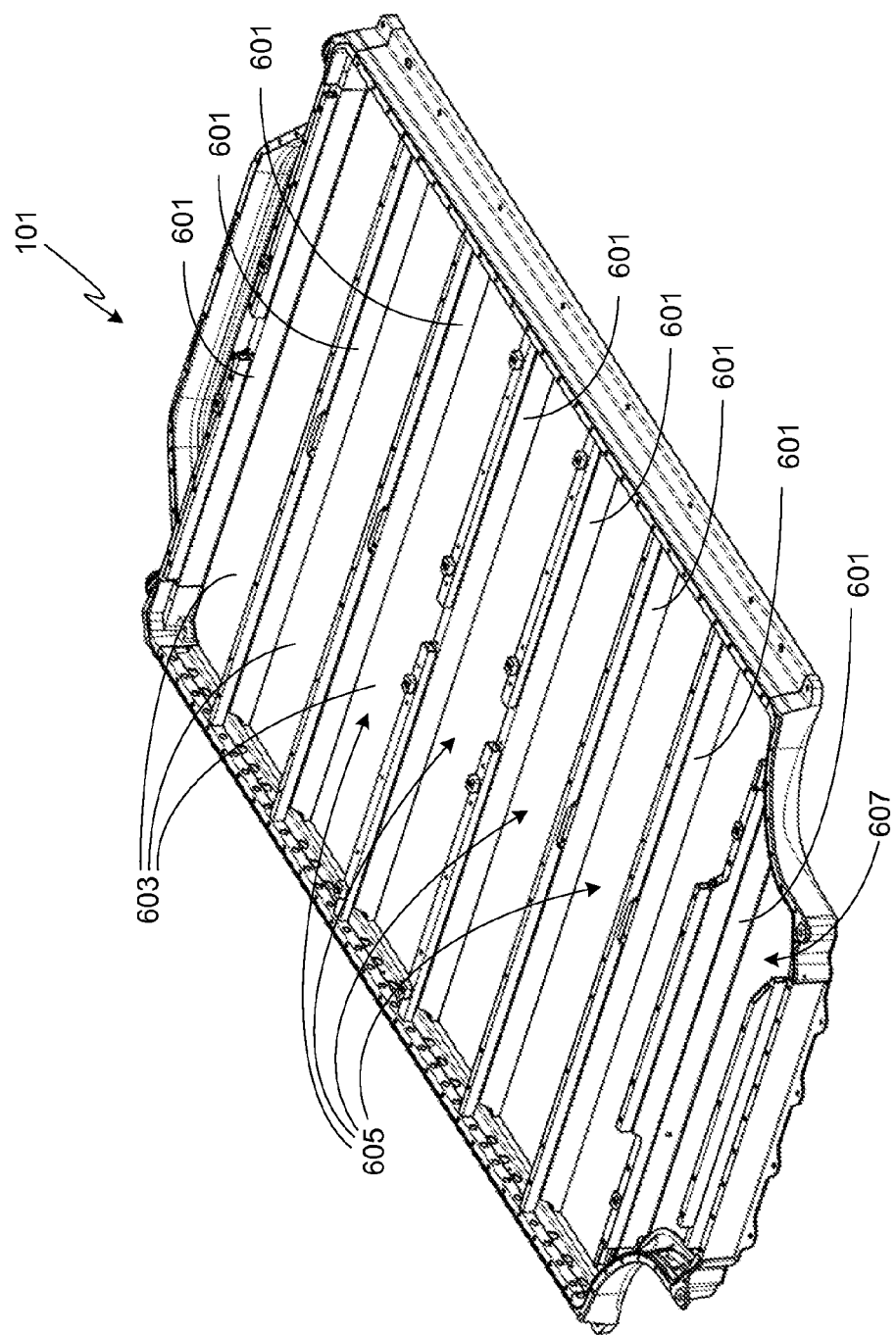
FIG. 6 provides a perspective view of the battery pack shown in FIGS. 1-5, with the top panel removed.

FIG. 5 provides a perspective view of battery pack enclosure 101 with the top enclosure panel 501 in place, panel 501 preferably providing a substantially airtight seal. Hollow side structural elements 405 are also visible, members 405 preferably including an extended region or flange 407 that is used to mechanically and thermally couple the side members 405 to the vehicle structure (not shown in this figure). FIG. 6 shows battery pack 101 with top member 501 removed, this view showing cross-members 601. The number of cross-members is based on the number of cells/cell modules that are to be contained within the battery pack while the dimensions of individual cross-members are based on the desired structural characteristics of the battery pack enclosure. Preferably battery pack side members 405, including extended region 407, battery pack top panel 501 and battery pack bottom panel 603 are each fabricated from a light weight metal, such as aluminum or an aluminum alloy, although other materials such as steel may be used for some or all of the battery pack components. Bottom panel 603 may be welded, brazed, soldered, bonded or otherwise attached to side members 405, with the resultant joint between panel 603 and member 405 preferably being substantially air-tight as well as being strong enough to allow bottom panel 603 to support the batteries contained within the pack. Top panel 501 is typically attached to member 405 using bolts or similar means, thus simplifying battery replacement as well as allowing battery interconnects, battery pack components, cooling system components and other battery pack components to be repaired and/or replaced.

Cross-members 601 provide several benefits. First, members 601 provide mechanical and structural strength and rigidity to the battery pack enclosure as well as to the vehicle to which the battery pack is attached. Second, members 601 help to segregate thermal events by providing a thermal barrier between groups of cells as well as minimizing gas flow between sections 605, sections 605 being defined by the cross-members, side members 405, top member 501 and bottom member 603. By segregating thermal events within smaller groups of cells, thermal runaway propagation is limited as is the potential for battery pack damage.

Figure 7:
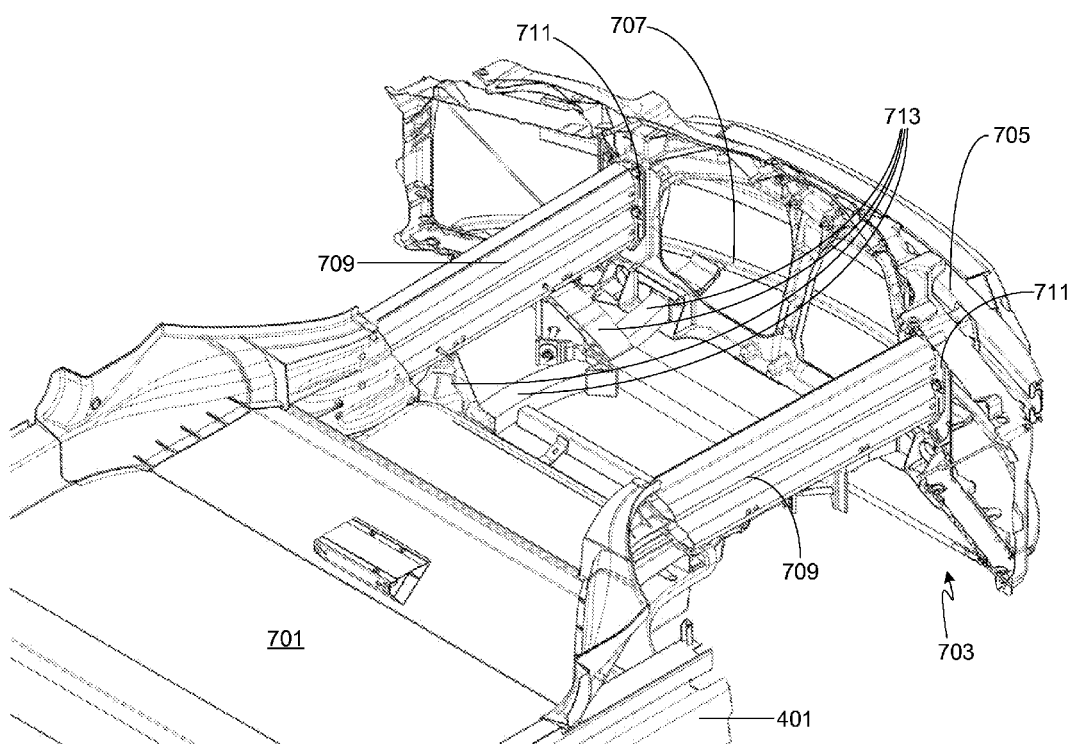
FIG. 7 provides a perspective view of the primary components associated with the primary and secondary front impact load paths in accordance with one aspect of the invention.
Figure 8:
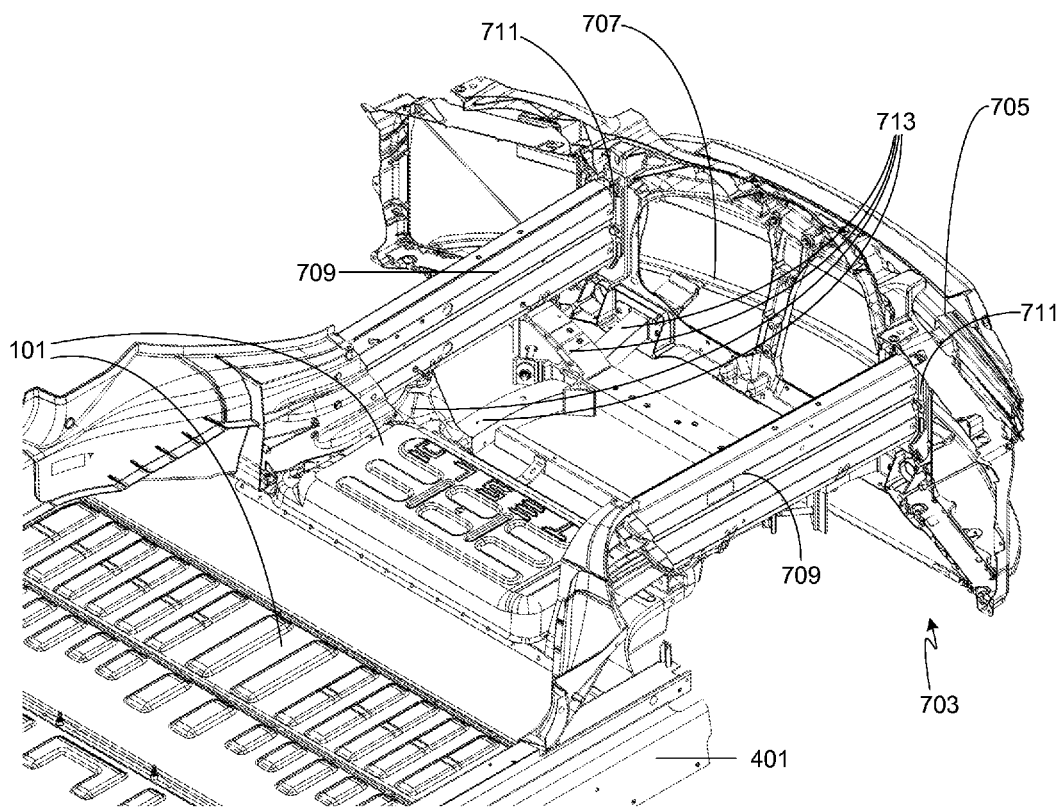
FIG. 8 provides a perspective view similar to that shown in FIG. 7, with several battery enclosure cover panels removed so that the battery pack enclosure is clearly visible.

FIGS. 7 and 8 provide perspective views of the primary components of the primary and secondary load paths associated with the preferred embodiment of vehicle 100. The primary difference between FIGS. 7 and 8 is that in FIG. 7 battery enclosure 101 is covered by several panels 701, while in FIG. 7 battery pack enclosure 101 is clearly visible. Both views clearly show the front module 703, as well as the primary bumper 705 and a secondary bumper 707. As shown, secondary bumper 707 is positioned much lower to the ground than primary bumper 705, thus reducing the severity of injuries if the vehicle is involved in an accident with a pedestrian.

Figure 27:
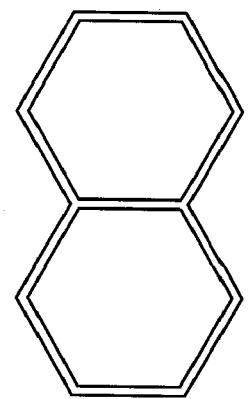
FIG. 27 provides a cross-sectional view of a front rail utilizing regular, hexagon-shaped structures for the upper and lower channels.
Figure 28:
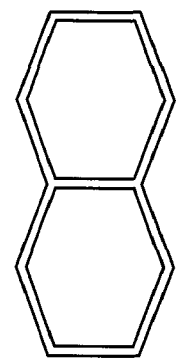
FIG. 28 provides a cross-sectional view of a front rail utilizing non-regular, hexagon-shaped structures for the upper and lower channels.

FIGS. 9-13 illustrate a preferred approach to mechanically coupling the primary bumper 705 to the front rails 709. In the preferred embodiment and as illustrated in the accompanying figures, the vehicle side rails 709, which extend in a longitudinal direction and are located on opposite traverse sides of the vehicle as shown, are comprised of a pair of multi-walled channels that share a common wall. In at least some embodiments, and as shown, each channel is a non-regular, octagon-shaped structure. In at least some other embodiments, each channel is a regular, octagon-shaped structure; alternately, a regular or non-regular hexagon-shaped structure (FIGS. 27 and 28, respectively). The multi-walled channel shape provides strength and rigidity in a relatively low-weight structure. Vehicle side rails 709 are preferably fabricated from aluminum or an aluminum alloy using an extrusion process, although other materials and fabrication processes may be used. In this embodiment, the double-octagon shaped structure has a height of approximately 200 millimeters, a width of approximately 76 millimeters, and a wall thickness of between 2-4 millimeters while in at least one vehicle configuration, the length of each front rail 709 is approximately 800 millimeters taken at its longest point. The tall cross-sectional height of the front rails (i.e., preferably at least 2 times the cross-sectional width of the front rails, more preferably at least 2.5 times the cross-sectional width of the front rails) reduces the distance between the neutral axis of the rail cross-section and the neutral axis of side sills 401, thus helping to balance the collapse mode of the front vehicle structure.

In the illustrated embodiment, interposed between each front rail 709 and bumper 705 is a crush can 1201, crush can 1201 preferably being fabricated from steel although other materials (e.g., aluminum, aluminum alloys, etc.) may be used. Crush cans 1201 are designed to collapse during a crash, thus absorbing some or all of the load energy, depending upon the impact force, imparted to the bumper by the collision. The crush cans are attached to the front rails using a pair of mounting flanges, the first flange 1203 corresponding to crush can 1201 and the second, complementary flange 901 corresponding to a bumper mounting plate 711. Mounting plate 711 is preferably fabricated from aluminum, for example using a high pressure die casting technique, although other materials (e.g., aluminum alloy, steel, etc.) and fabrication techniques may be used. A third flange 1301, only partially visible in these figures, is used to attach bumper 705 to the front of each crush can 1201. In this embodiment, each crush can is aligned with the upper channel 1101 of rails 709, thus achieving a direct transfer of front impact loads from bumper 705 to the top rail channel 1101. Lower rail channel 1103 adds to the load carrying capabilities of the each front rail 709 while lowering the neutral axis of the rail section. Additionally, due to the high stiffness of bumper mounting plate 711, impact loads are effectively transferred not only to upper channel 1101 of rail 709, but also to lower channel 1103, thus insuring a stable axial collapse of the rail tip.

Flanges 1203 and 901 are bolted together using a plurality of bolts 1205. One benefit of using mounting flanges or similar means to hold the crush structures in place is that in the case of a minor collision it is often possible to simply remove and replace the crush structure assemblies, along with bumper 705, without having to repair the primary vehicle structure (e.g., front side rails). In the illustrated configuration, interposed between mounting flanges 901 and 1203 is a mounting surface 1207 of front module 703.

Figure 9:
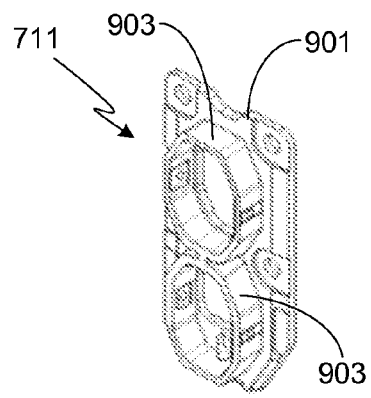
FIG. 9 provides a perspective, detailed view of a front rail to bumper mounting plate.
Figure 10:
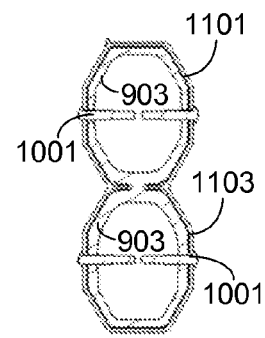
FIG. 10 provides a cross-sectional view of a section of a front rail attached to the bumper mounting plate, this view taken through the plane containing the mounting rivets.
Figure 11:
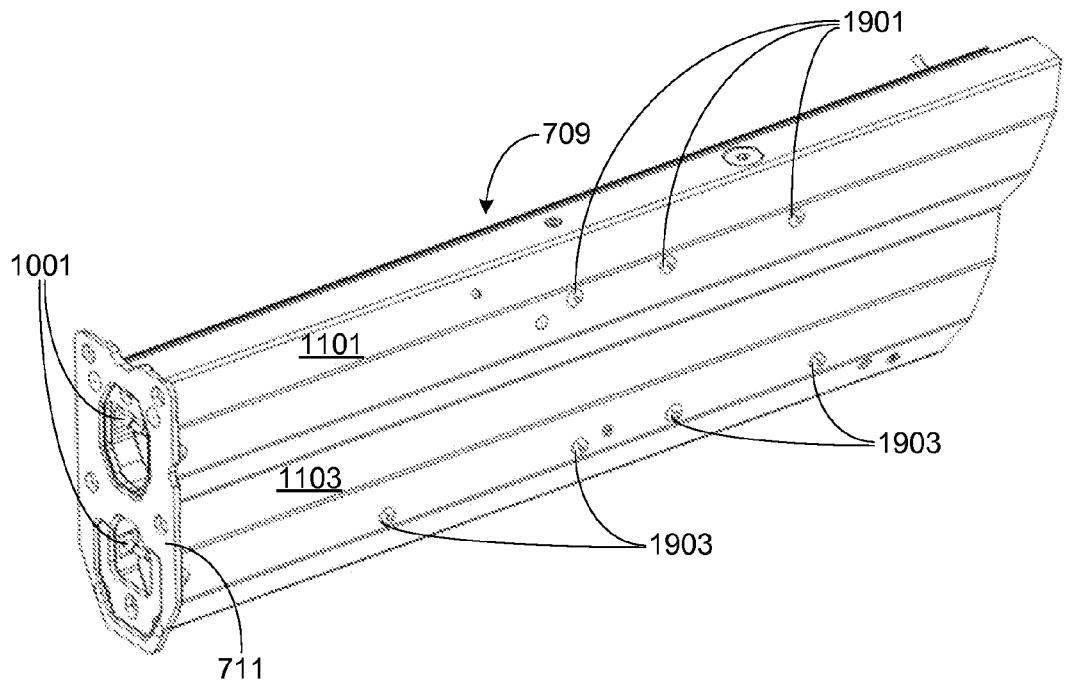
FIG. 11 provides a perspective view of a bumper mounting plate attached to a front rail.
Figure 12:
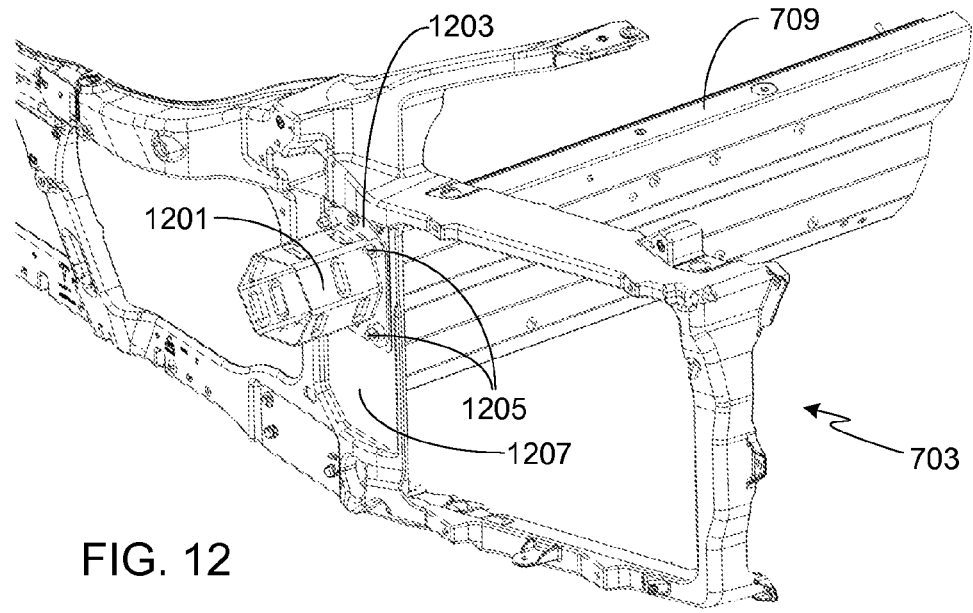
FIG. 12 provides a perspective view of a crush can and bumper module coupled to a front rail.
Figure 13:
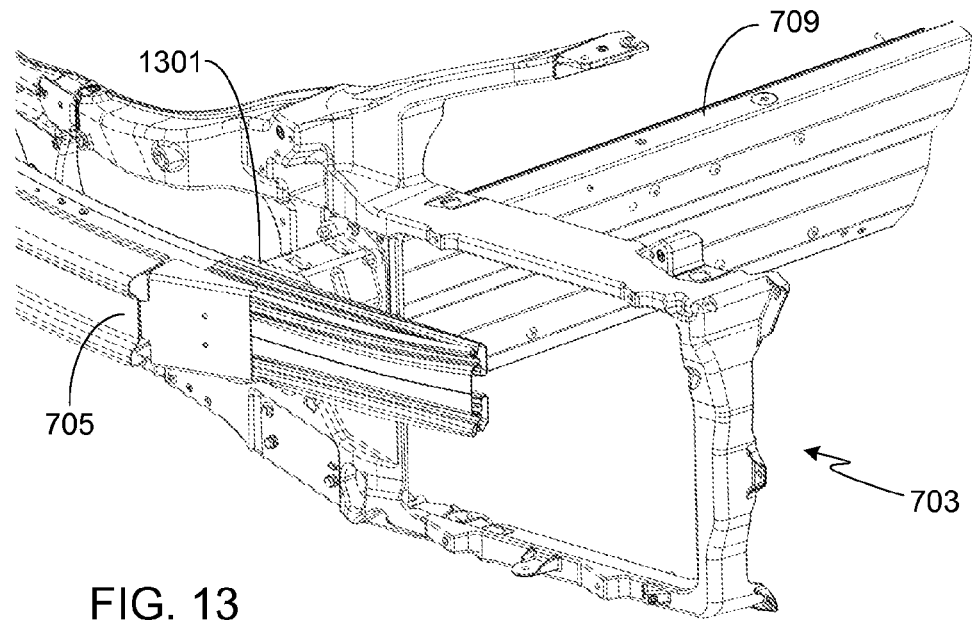
FIG. 13 provides a perspective view similar to that provided in FIG. 12, with the addition of the primary bumper coupled to the crush can.
Figure 14:
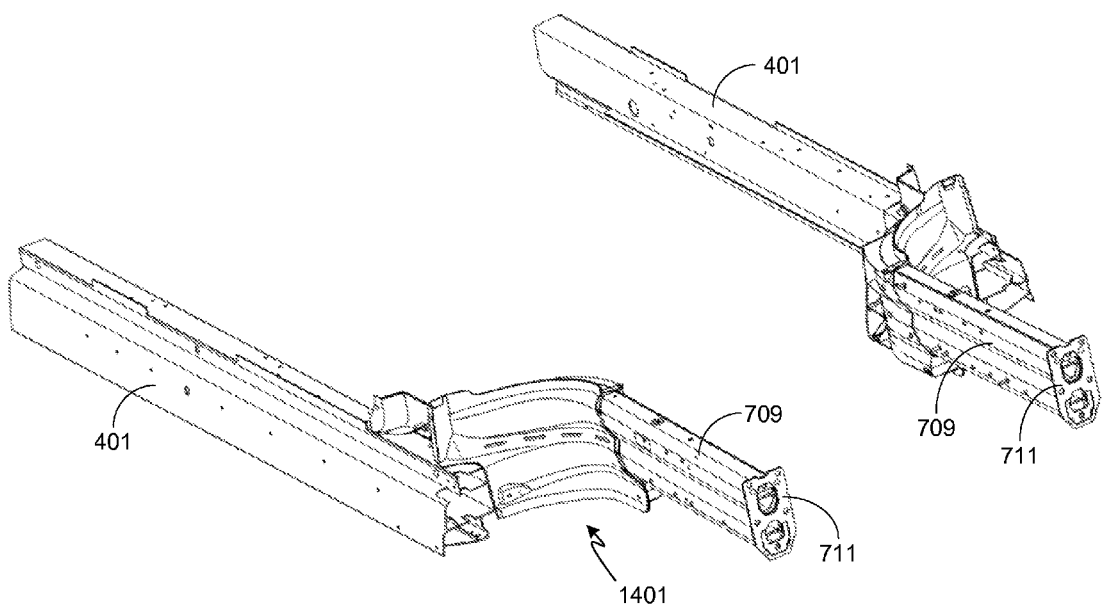
FIG. 14 provides a perspective view of the mechanical coupling of the front rails to the side sills via a pair of swept torque boxes.

As shown in FIG. 9, in addition to mounting flange 901, bumper mounting plate 711 includes a pair of sleeves 903. Sleeves 903 are configured to fit within the ends of upper channel 1101 and lower channel 1103 of front rail 709 as illustrated in FIGS. 10 and 11. Mounting plate 711 is preferably attached to rail 709 with a plurality of rivets 1001 as shown. In at least one embodiment, a structural adhesive is also used between the front rails and the bumper mounting plate.

Figure 17:
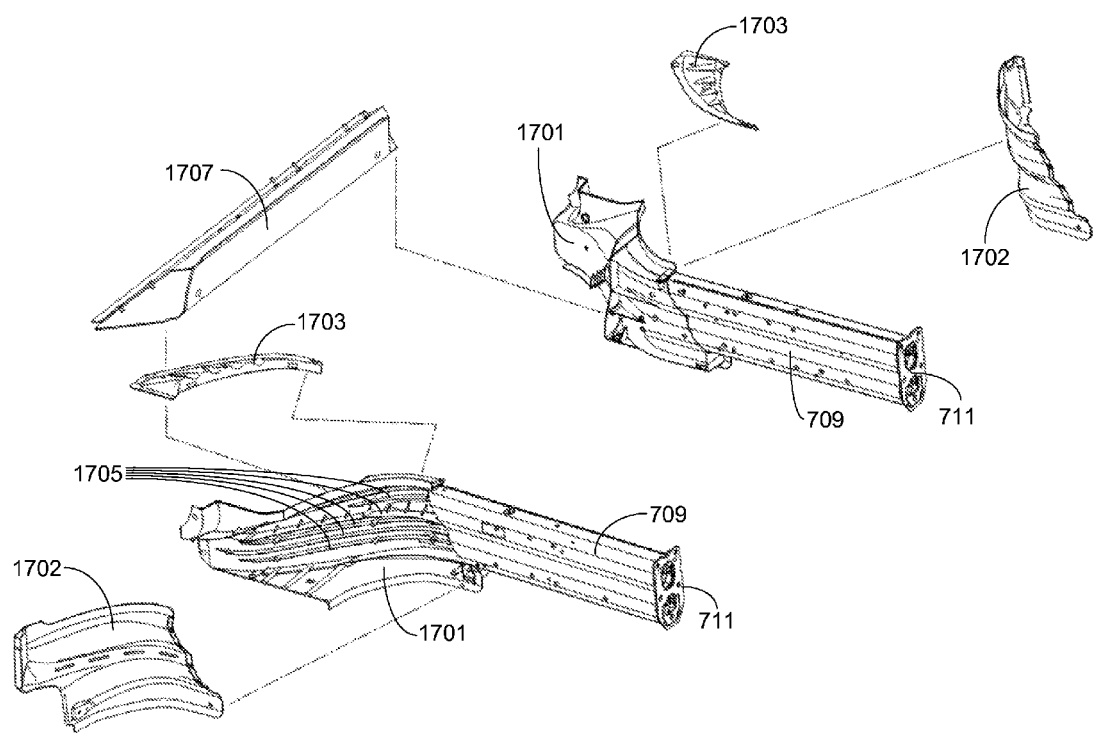
FIG. 17 provides a detailed, perspective view of the front rail/torque box assembly shown in FIGS. 14-16.

FIGS. 14-17 illustrate the mechanical coupling of front rails 709 to rocker panels 401, also referred to herein as side sills or simply as rockers. As illustrated, front rails 709 are attached to rockers 401 using a pair of swept (i.e., curvilinear) torque boxes 1401, the curvilinear (i.e., swept) shape helping to redirect impact loads outward to rocker panels 401. In this embodiment, each torque box is comprised of three members 1701-1703 that are assembled using MIG welding, either alone or in combination with rivets. Primary torque box member 1701 is heavily ribbed as illustrated (see, for example, ribs 1705). Preferably primary torque box member 1701, and more preferably all three members 1701-1703, are fabricated from aluminum, for example using a high pressure die casting technique, although other materials (e.g., aluminum alloy, steel, etc.) and fabrication techniques may be used. Members 1702 and 1703, while coupled to the primary torque box member 1701, are actually outer and inner rail extensions, respectively. Also shown in FIG. 17 is a cross-member 1707 that is welded between, and to, the pair of front torque boxes 1701.

Figure 15:
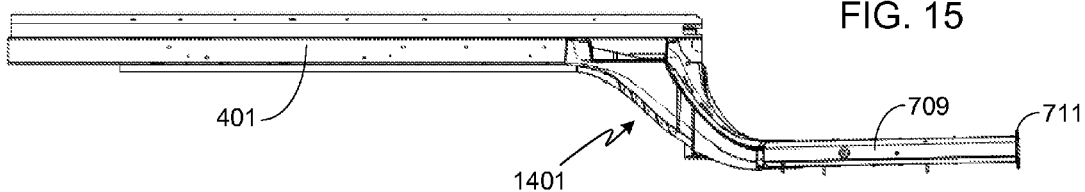
FIG. 15 provides a top view of the assembly shown in FIG. 14.
Figure 16:
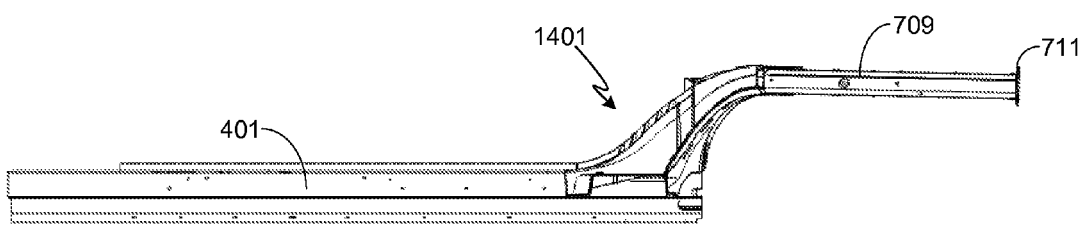
FIG. 16 provides a side view of the assembly shown in FIG. 14.
Figure 16:
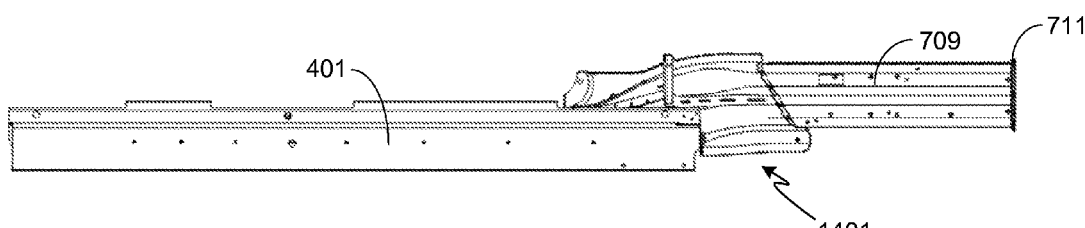

In the preferred embodiment, each torque box 1401 is welded to the corresponding front rail 709 and to the corresponding sill 401. The heat affected zone at the weld joint between the torque box and the front rail, along with the angle of the front rail rear tip section and thus the angle of the joint, helps to initiate controlled bending of the rail system during a front vehicle collision. In the illustrated embodiment, the angle between the horizontal plane and the end surface of rail 709, measured from the bottom surface of the rail, is in the range of 100 to 140 degrees, preferably in the range of 110 to 130 degrees, more preferably in the range of 115 to 125 degrees, and still more preferably approximately 120 degrees. Additionally, and as illustrated in FIG. 15, in the preferred embodiment the front rails are not parallel, rather rails 709 are offset by approximately 2.5 degrees thus providing improved performance during a vehicle collision.

Figure 18:
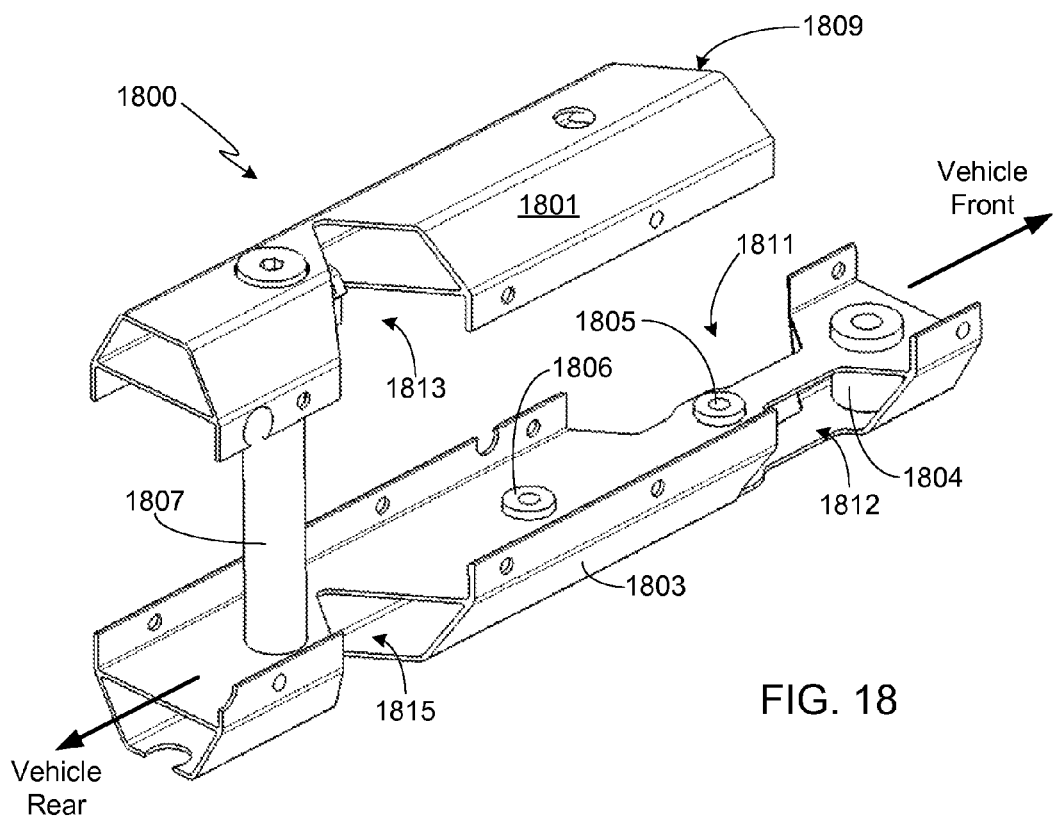
FIG. 18 provides a perspective view of an exemplary rail reinforcement member, this reinforcement member being configured for the left hand front rail.
Figure 19:
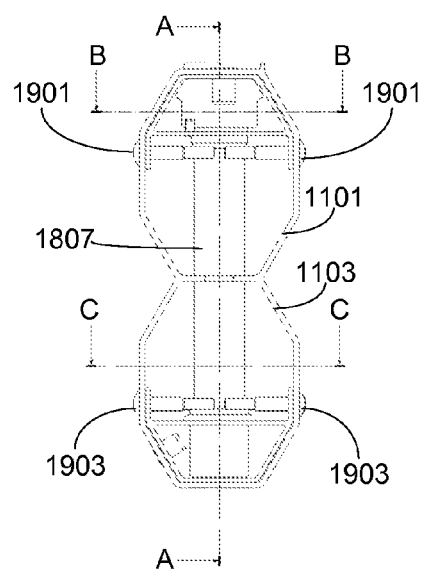
FIG. 19 provides an end view of rail reinforcement member within a front rail.
Figure 20:
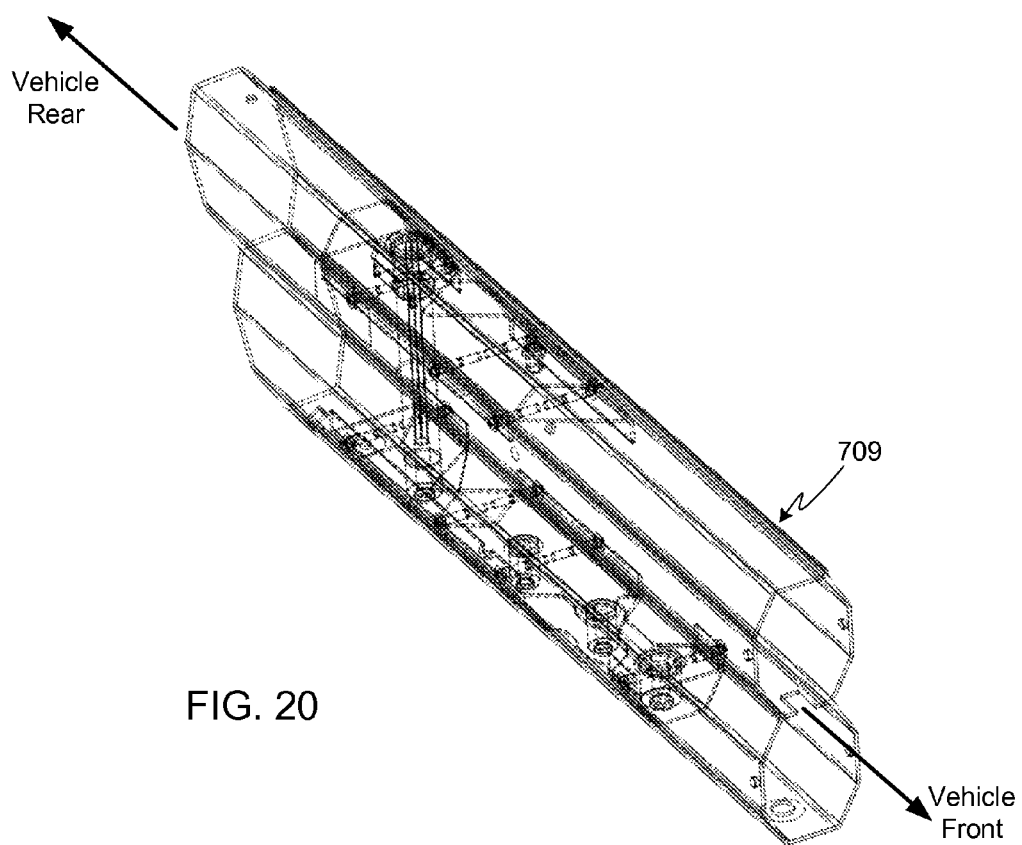
FIG. 20 provides a perspective view of a front rail, shown in phantom, which includes the internally mounted, rail reinforcement member.
Figure 21:
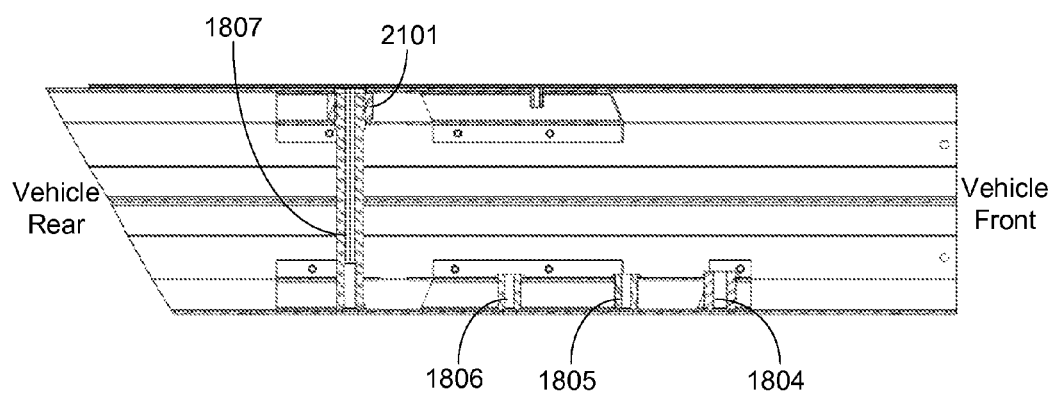
FIG. 21 provides a cross-sectional side view taken along a longitudinal plane of a front rail with an integral reinforcement member.
Figure 22:
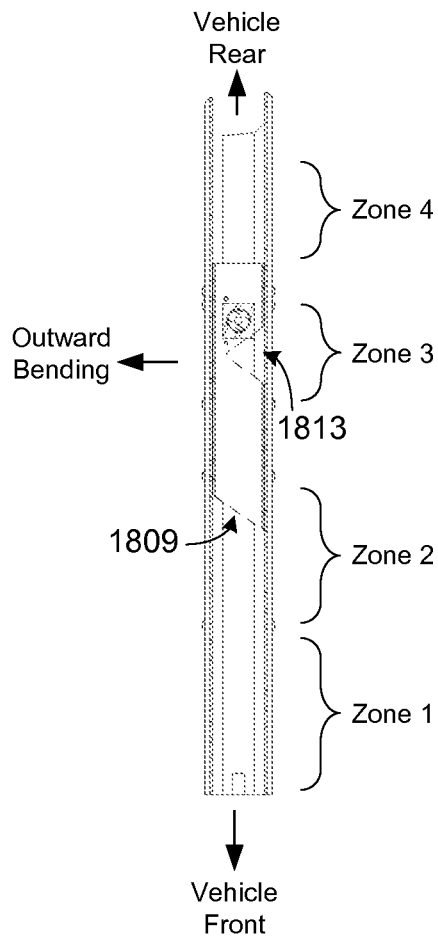
FIG. 22 provides a cross-sectional top down view taken along a longitudinal plane of the front rail with integral reinforcement member shown in FIG. 21, this reinforcement member being configured for the right hand front rail.
Figure 23:
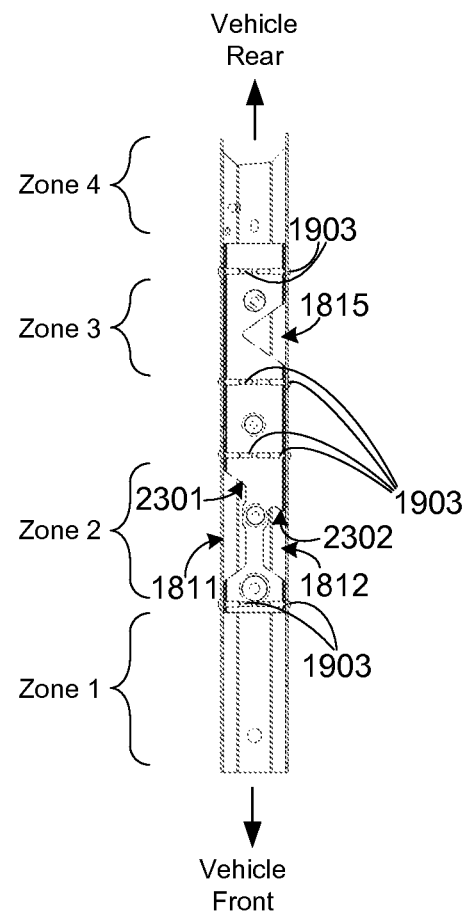
FIG. 23 provides a cross-sectional top down view taken along a longitudinal plane of the front rail with integral reinforcement member shown in FIG. 21, this reinforcement member being configured for the right hand front rail.
Figure 24:
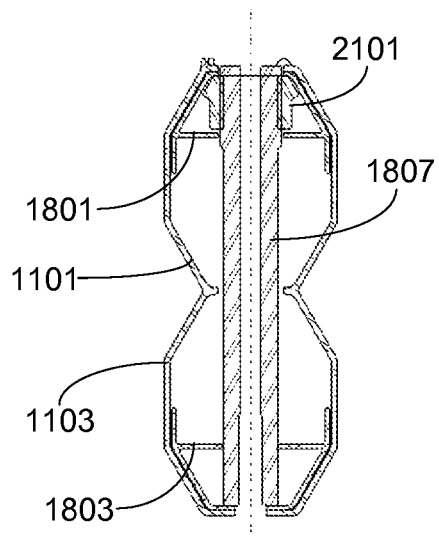
FIG. 24 provides a cross-sectional end view of the front rail with integral reinforcement member taken along a plane that intersects the primary sub-frame mount.

In order to further tune the response of the front vehicle structures to front vehicle impacts, in at least one preferred embodiment a front rail reinforcement member is mechanically coupled to each of the front rails. FIG. 18 provides a perspective view of an exemplary rail reinforcement member 1800, the design of which allows the member to be inserted into a front rail. FIG. 19 provides an end view of rail reinforcement member 1800 within a front rail 709. FIG. 20 provides a perspective view of a front rail 709, shown in phantom, which includes the internally mounted, rail reinforcement member 1800. FIG. 21 provides a cross-sectional side view taken along longitudinal plane A-A of a front rail 709 with integrated reinforcement member 1800. FIG. 22 provides a cross-sectional top down view taken along longitudinal plane B-B of the front rail with integral reinforcement member shown in FIG. 21. FIG. 23 provides a cross-sectional top down view taken along longitudinal plane C-C of the front rail with integral reinforcement member shown in FIG. 21. FIG. 24 provides a cross-sectional end view taken along a plane that intersects the primary sub-frame mount.

In a preferred embodiment, each rail reinforcement member is comprised of an upper member 1801, configured to fit within upper rail channel 1101, and a lower member 1803, configured to fit within lower rail channel 1103. Upper member 1801 and lower member 1803 are preferably fabricated using an extrusion process and formed of aluminum or an aluminum alloy, although other materials (e.g., steel) and fabrication techniques may be used. Upper member 1801 is mechanically coupled to the upper rail channel 1101 with a plurality of rivets 1901. Similarly, lower member 1803 is mechanically coupled to the lower rail channel 1103 with a plurality of rivets 1903. Additionally, lower member 1803 is coupled to the vehicle sub-frame structure (e.g., frame members 713 shown in FIGS. 7 and 8) using a plurality of sub-frame mounts (e.g., mounts 1804-1807). It will be appreciated that by coupling lower member 1803 to the sub-frame, rail 709 into which the reinforcement member is integrated is also coupled to the vehicle sub-frame via the sub-frame mounts 1804-1807.

In the illustrated and preferred embodiment, at least one of the sub-frame mounts (e.g., mount 1807) extends through both upper reinforcement member 1801 and lower reinforcement member 1803. Sub-frame mount 1807 is coupled to upper reinforcement member 1801 with nut 2101. In addition to coupling both the upper and lower reinforcement members to the vehicle's sub-frame structure, mount 1807 also insures that the upper and lower reinforcement members are aligned.

The rail reinforcement members, i.e., members 1800, are used to control the way in which the vehicle's front structure reacts to front impacts, i.e., those arising from vehicle collisions. In particular, if the impact load on bumper 705 is large enough to transfer a significant force through the crush cans 1201 (assuming the use of crush cans) and into the front rails, the reinforcement members define the reaction of the rails. As a result of the inclusion of reinforcement members within the front rails, as the impact load is transferred into the rails initially the front zone (zone 1 in FIGS. 22 and 23) will axially collapse. The front sections of the rails will also tend to bend slightly inward, i.e., towards the center of the vehicle. Note that zone 1 corresponds to the region in front of the reinforcement member 1800.

If the impact force is large enough, in addition to causing the collapse of the forward section of the rails, the impact force will cause the middle section of the rails to bend, preferably bending in a horizontal plane. In the illustrated configuration, due to the shape of the features in zones 2 and 3 of the reinforcement members, the middle rail sections will bend outwardly, away from the vehicle centerline. Bend initiation is promoted by the features within zone 2, specifically the angled leading edge 1809 of upper member 1801, and the cutouts 1811/1812 on lower member 1803. Note that to promote bending in the desired direction, cutout 1812 is smaller than cutout 1811. Additionally, edge 2301/2302 is angled, with the angle of edge 2301/2302 being similar to, or the same as, the angle of edge 1809. Outward bending within a horizontal plane is also aided by the features within zone 3, specifically notch 1813 on the interior side of the upper reinforcement member 1801 (relative to the vehicle) and a similar notch 1815 on the interior side of the lower reinforcement member 1803. Bending within a horizontal plane is especially aided by aligning notches 1813 and 1815 and using front rails with a relatively tall cross-section. Bending within zone 4 is promoted by the elimination of the reinforcement member 1800 within the rail, and the heat affected zone at the weld joint between the swept torque boxes 1401 and the front rails 709. It will be appreciated that other features may be included within the reinforcement members in order to promote different reactions to front impact loads, e.g., inward bending of the mid-rail section, out-of-plane bending of the rails, different size or elimination of the axial collapse region at the front tip of the rails, etc.

As described above and illustrated in FIGS. 7 and 8, the preferred embodiment of the vehicle front structure includes a primary bumper 705 and a secondary bumper 707, with secondary bumper 707 being positioned much lower to the ground than the primary bumper 705. These two bumpers are coupled to the vehicle using two different sets of structures. As a result, this configuration provides two different pathways that work in parallel to absorb and distribute impact loads arising from vehicle frontal collisions.

In general and especially given the height of the bumpers, bumper 705 provides the primary load path during a collision. However, except in very minor collisions, lower bumper 707 will also be impacted, thereby providing a secondary load path that helps to absorb and distribute the impact energy and minimize the effects of the impact on the passenger cabin and the vehicle's occupants. In the following description and the referenced figures, it should be understood that in a typical and preferred vehicle configuration, front module 703 is simply attached to the upper and lower load structures but may have minimal effect on the absorption and distribution of impact loads. For example and as described above, module 703 simply includes a mounting flange that, in the illustrated embodiment, is positioned between the crush can mounting flange 1203 and the mounting flange of the front rail mounting plate 711. As the module mounting flange has virtually no effect on the transfer of impact energy through bumper 705 and crush cans 1201 and into the front rails 709, this module has little effect on load absorption and distribution.

Figure 25A:
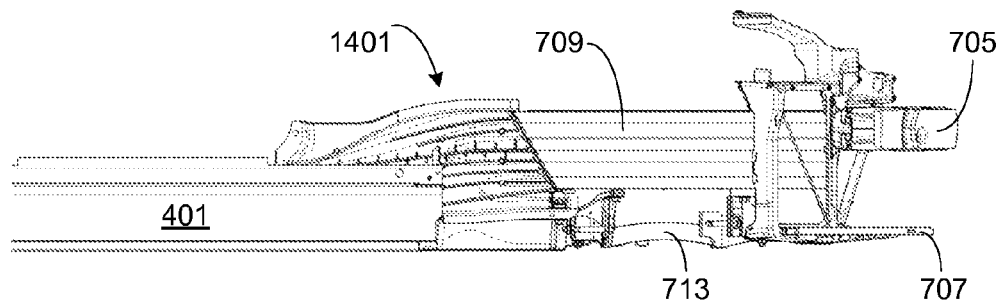
FIG. 25A provides a side view of the assembly shown in FIGS. 7 and 8.
Figure 25B:
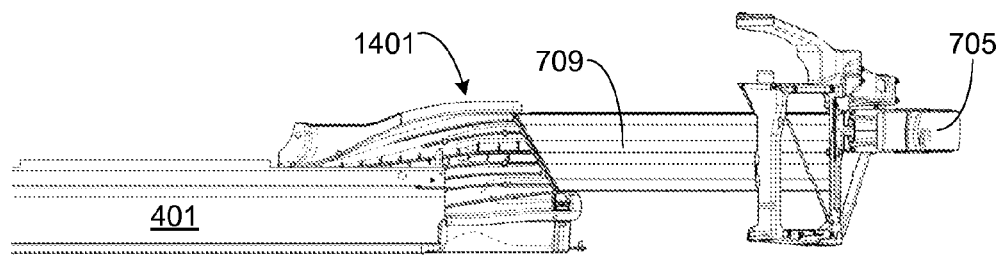
FIG. 25B provides a side view similar to that provided in FIG. 25A, with the lower load path removed.
Figure 25C:
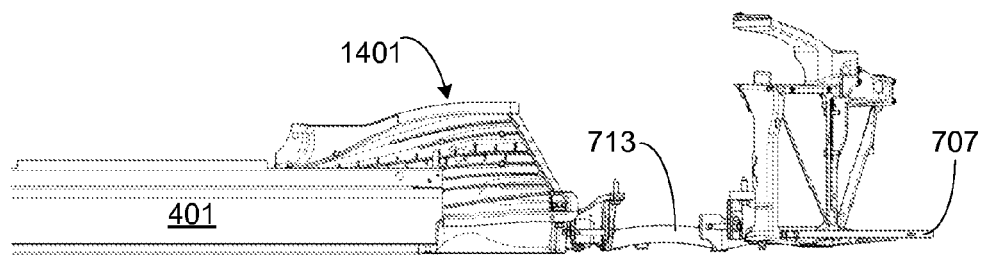
FIG. 25C provides a side view similar to that provided in FIG. 25A, with the upper load path removed.
Figure 26A:
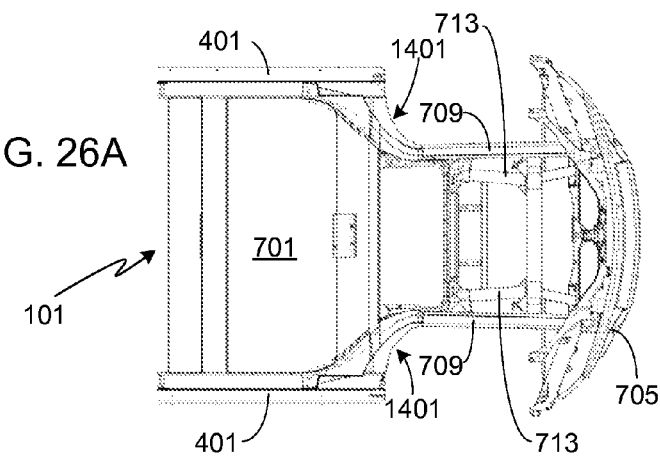
FIG. 26A provides a top view of the assembly shown in FIG. 7.
Figure 26B:
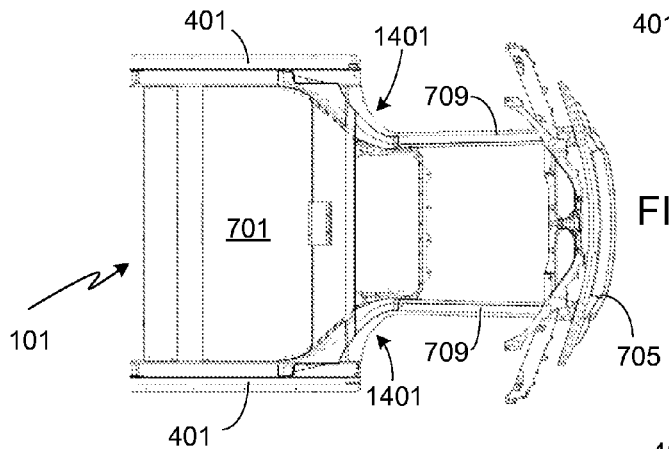
FIG. 26B provides a top view similar to that provided in FIG. 26A, with the lower load path removed.
Figure 26C:
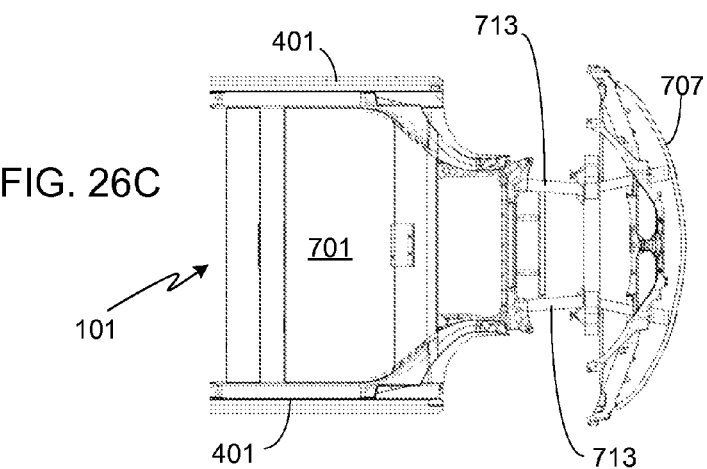
FIG. 26C provides a top view similar to that provided in FIG. 26A, with the upper load path removed.

FIGS. 25A-25C and 26A-26C illustrate the two different impact load paths of the preferred embodiment with FIGS. 25A-25C and FIGS. 26A-26C providing side and top views, respectively, of the primary structures involved in each load path. In particular, FIGS. 25A and 26A illustrate both impact load paths; FIGS. 25B and 26B illustrate the primary impact load path which is coupled to the primary bumper 705; and FIGS. 25C and 26C illustrate the secondary load path which is coupled to the secondary bumper 707.

As illustrated, primary bumper 705 transfers impact load energy through the front rails 709 and the swept torque boxes 1401 into side sills 401. Preferably a battery pack enclosure 101 is interposed between, and attached to, the side sills as described and illustrated above, thereby providing additional strength and rigidity to the side sill. In such a configuration, impact energy arising from large frontal collisions is also absorbed and distributed into the battery pack enclosure. In the preferred embodiment, crush cans 1201 are interposed between primary bumper 705 and front rails 709 and reinforcement members 1800 are used within front rails 709 to aid in front impact load absorption and distribution.

In the secondary load path, load energy arising from an impact on secondary bumper 707 is transferred into the sub-frame members 713. Although crush cans may be added between bumper 707 and sub-frame members 713, in the preferred embodiment bumper 707 is directly coupled to sub-frame members 713 without the inclusion of crush cans. In the preferred and illustrated embodiment, sub-frame members 713 are attached to the front structure 503 of battery pack enclosure 101 (see, for example, FIG. 5), thus allowing impact energy passing through sub-frames members 713 to be absorbed and distributed by the battery pack enclosure.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A front structure of a vehicle comprising:
   a pair of front rails, wherein said pair of front rails are spaced apart in a widthwise direction relative to said vehicle, wherein each of said pair of front rails extend in a lengthwise direction relative to said vehicle, wherein said pair of front rails comprise a front left hand rail and a front right hand rail, wherein each of said pair of front rails is comprised of a polygonal-shaped upper hollow channel and a polygonal-shaped lower hollow channel, and wherein said polygonal-shaped upper hollow channel and said polygonal-shaped lower hollow channel share a common wall; and
   a pair of bumper mounting plates, wherein a first bumper mounting plate of said pair of bumper mounting plates is mechanically attached to both said polygonal-shaped upper hollow channel and said polygonal-shaped lower hollow channel of a first end portion of said front left hand rail and a second bumper mounting plate of said pair of bumper mounting plates is mechanically attached to both said polygonal-shaped upper hollow channel and said polygonal-shaped lower hollow channel of a first end portion of said front right hand rail, wherein a mounting flange of said first bumper mounting plate is mechanically coupled to a left hand mounting bracket of a vehicle bumper, wherein said first bumper mounting plate aligns said upper polygonal-shaped upper hollow channel of said front left hand rail to said left hand mounting bracket of said vehicle bumper, wherein a mounting flange of said second bumper mounting plate is mechanically coupled to a right hand mounting bracket of said vehicle bumper, and wherein said second bumper mounting plate aligns said upper polygonal-shaped upper hollow channel of said front right hand rail to said right hand mounting bracket of said vehicle bumper.

2. The front structure of claim 1, wherein said pair of bumper mounting plates transfer impact loads from said vehicle bumper to said polygonal-shaped upper hollow channel and said polygonal-shaped lower hollow channel of said front left hand rail and to said polygonal-shaped upper hollow channel and said polygonal-shaped lower hollow channel of said front right hand rail.

3. The front structure of claim 1, wherein said first bumper mounting plate further comprises an upper sleeve configured to fit within said polygonal-shaped upper hollow channel and a lower sleeve configured to fit within said polygonal-shaped lower hollow channel of said first end portion of said front left hand rail, and wherein said second bumper mounting plate further comprises an upper sleeve configured to fit within said polygonal-shaped upper hollow channel and a lower sleeve configured to fit within said polygonal-shaped lower hollow channel of said first end portion of said front right hand rail.

4. The front structure of claim 3, wherein said upper and lower sleeves of said first bumper mounting plate are mechanically coupled to said polygonal-shaped upper hollow channel and said polygonal-shaped lower hollow channel of said first end portion of said front left hand rail with a first plurality of rivets, and wherein said upper and lower sleeves of said second bumper mounting plate are mechanically coupled to said polygonal-shaped upper hollow channel and said polygonal-shaped lower hollow channel of said first end portion of said front right hand rail with a second plurality of rivets.

5. The front structure of claim 3, wherein said upper and lower sleeves of said first bumper mounting plate are mechanically coupled to said polygonal-shaped upper hollow channel and said polygonal-shaped lower hollow channel of said first end portion of said front left hand rail with a first structural adhesive, and wherein said upper and lower sleeves of said second bumper mounting plate are mechanically coupled to said polygonal-shaped upper hollow channel and said polygonal-shaped lower hollow channel of said first end portion of said front right hand rail with a second structural adhesive.

6. The front structure of claim 1, wherein said first and second bumper mounting plates are die cast.

7. The front structure of claim 1, wherein said first and second bumper mounting plates are comprised of a die cast aluminum or a die cast aluminum alloy.

8. The front structure of claim 1, further comprising a first crush can and a second crush can, wherein said first crush can is interposed between said first bumper mounting plate and said left hand mounting bracket of said vehicle bumper, and wherein said second crush can is interposed between said second bumper mounting plate and said right hand mounting bracket of said vehicle bumper.

9. The front structure of claim 1, further comprising a front vehicle module, wherein a first mounting plate of said front vehicle module is interposed between said first bumper mounting plate and said left hand mounting bracket of said vehicle bumper, and wherein a second mounting plate of said front vehicle module is interposed between said second bumper mounting plate and said right hand mounting bracket of said vehicle bumper.

10. The front structure of claim 1, wherein said front left hand rail and said front right hand rail are each comprised of a material selected from the group consisting of aluminum extrusions, aluminum alloy extrusions and steel extrusions.

11. The front structure of claim 1, wherein said front left hand rail and said front right hand rail each have a cross-sectional height and a cross-sectional width, wherein said cross-sectional height is at least twice said cross-sectional width.

12. The front structure of claim 1, wherein said front left hand rail and said front right hand rail each have a cross-sectional height and a cross-sectional width, wherein said cross-sectional height is at least 2.5 times said cross-sectional width.

13. The front structure of claim 1, wherein said polygonal-shaped upper hollow channel and said polygonal-shaped lower hollow channel of said front left hand rail and said polygonal-shaped upper hollow channel and said polygonal-shaped lower hollow channel of said front right hand rail each utilize a non-regular, octagon-shaped structure.

14. The front structure of claim 1, wherein said polygonal-shaped upper hollow channel and said polygonal-shaped lower hollow channel of said front left hand rail and said polygonal-shaped upper hollow channel and said polygonal-shaped lower hollow channel of said front right hand rail each utilize a hexagon-shaped structure.

15. The front structure of claim 1, wherein said front left hand rail is not parallel with said front right hand rail.

16. The front structure of claim 1, wherein a second end portion of said front left hand rail distal from said first end portion of said left hand rail is mechanically coupled to a left hand torque box, wherein a second end portion of said front right hand rail distal from said first end portion of said right hand rail is mechanically coupled to a right hand torque box, and wherein said left hand torque box is mechanically coupled to a left hand rocker panel and said right hand torque box is mechanically coupled to a right hand rocker panel.

17. The front structure of claim 16, further comprising—a battery pack enclosure mounted under said vehicle, said battery pack enclosure comprising an enclosure top panel, an enclosure bottom panel, and a plurality of enclosure side members, said battery pack enclosure mounted between and mechanically coupled to said left hand rocker panel and said right hand rocker panel, wherein said battery pack enclosure is mounted under a passenger cabin floor panel, wherein said battery pack enclosure further comprises a plurality of battery pack cross-members integrated into said battery pack enclosure, and wherein each of said plurality of battery pack cross-members transverses the distance between a first enclosure side member adjacent to said left hand rocker panel and a second enclosure side member adjacent to said right hand rocker panel.

18. The front structure of claim 17, wherein said enclosure bottom panel, said enclosure top panel, and said plurality of enclosure side members are each fabricated from a material selected from the group of materials consisting of aluminum, aluminum alloys and steel.

19. The front structure of claim 17, wherein said plurality of enclosure side members further comprise a mounting flange that is mechanically coupled to said left hand rocker panel and said right hand rocker panel using a plurality of bolts.

20. The front structure of claim 17, wherein said enclosure bottom panel is attached to said plurality of enclosure side members by one of welding, brazing, soldering or bonding, and wherein said enclosure top panel is bolted to said plurality of enclosure side members.

* * * * *